(No Model.)
L. M. HODGE.
MEASURING INSTRUMENT.
No. 518,103. Patented Apr. 10, 1894.
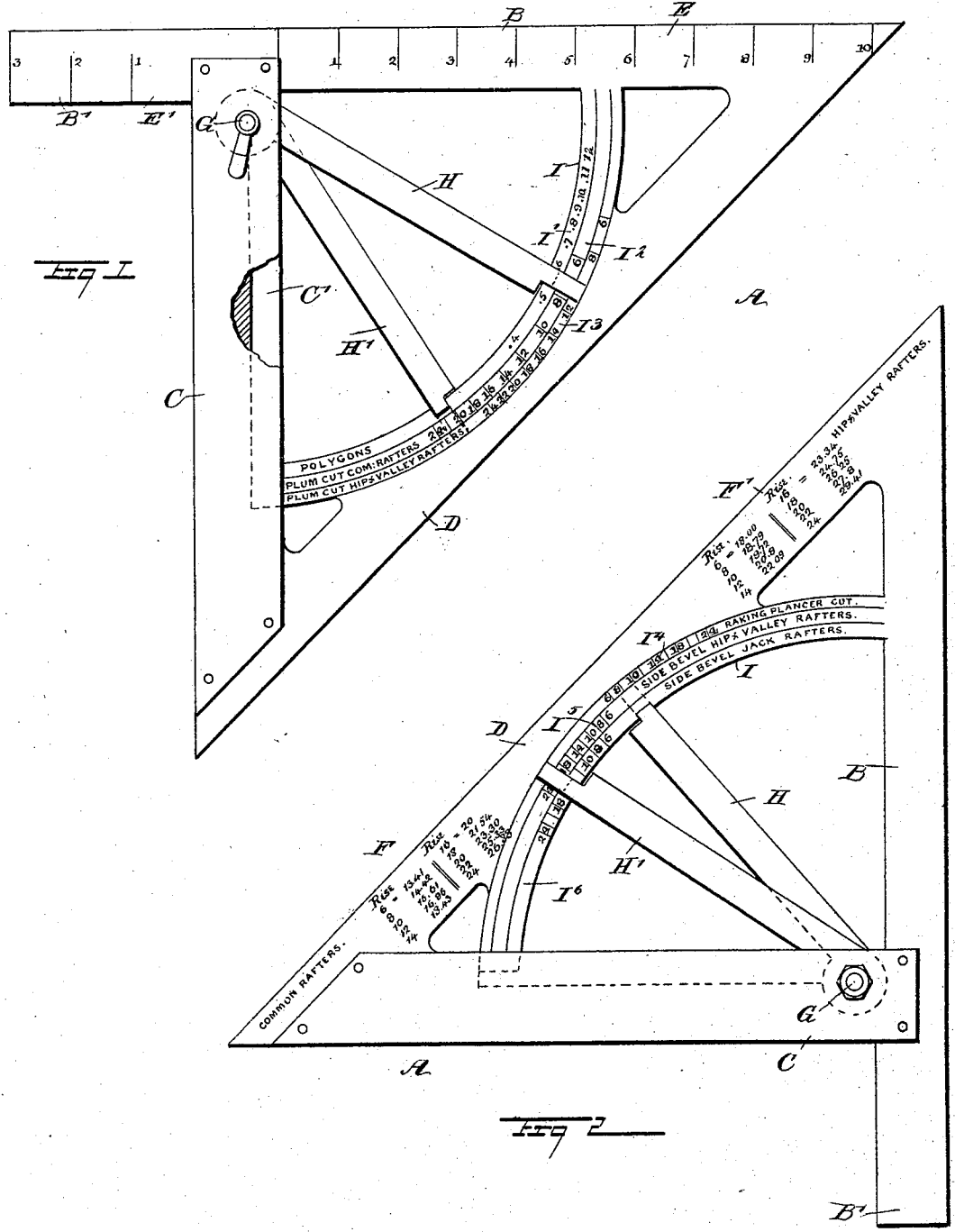
WITNESSES:
H. Walker
C. Sedgwick
INVENTOR
L. M. Hodge
BY
[signature]
ATTORNEYS.

UNITED STATES PATENT OFFICE.

LEONARD M. HODGE, OF SAN JOSÉ, CALIFORNIA.

MEASURING-INSTRUMENT.

SPECIFICATION forming part of Letters Patent No. 518,103, dated April 10, 1894.

Application filed June 2, 1893. Serial No. 476,359. (No model.)

*To all whom it may concern:*

Be it known that I, LEONARD M. HODGE, of San José, in the county of Santa Clara and State of California, have invented a new and Improved Measuring-Instrument, of which the following is a full, clear, and exact description.

The object of the invention is to provide a new and improved measuring instrument, which is simple and durable in construction, easily manipulated, and more especially designed for the use of carpenters and other mechanics, to readily obtain bevels for rafters and for other purposes.

The invention consists of a right angle triangle provided with two pivoted arms indicating on opposite sides of a graduated segment forming an integral part of the triangle.

The invention also consists of certain parts and details, and combinations of the same, as will be hereinafter described and then pointed out in the claims.

Reference is to be had to the accompanying drawings, forming a part of this specification, in which similar letters of reference indicate corresponding parts in both the figures.

Figure 1 is a front face view of the improvement with parts broken out; and Fig. 2 is a rear face view of the same.

The improved measuring instrument is provided with a right angle triangle A having a base B, the side C at right angles to the base B, and the side D forming angles of forty-five degrees with the base B and the side C. On the base B is arranged a graduation E, indicating lineal measurement such as inches and sub-divisions, and the said base B is provided with an extension B', projecting beyond the side C and also provided with a graduation E' of a similar nature to that of the graduation E. On the rear face of the side D are arranged the scales F and F', for determining the length of rafters. The side C forms a handle, and supports near the base B a pivot G, on which are fulcrumed the two arms H and H', indicating with their free ends on opposite sides of a segment I, as plainly illustrated in the drawings.

The two arms H and H' are adapted to fold into a recess C' arranged on the inner edge of the side C. The free end of the arm H indicates on three graduations I', I² and I³, arranged on the front face of the segment I, and the free end of the other arm H' indicates on three graduations I⁴, I⁵ and I⁶, formed on the rear face of the said segment I. The graduation I' indicates polygonal figures from a triangle to a dodecagon. The graduation I² indicates plumb cuts of common rafters in ten different pitches from one-quarter to a whole pitch. The graduation I³ indicates the plumb cuts of hip and valley rafters in ten pitches corresponding to the pitches in the graduation I². The scale I⁴ on the opposite side of the segment I indicates the cuts across the face of planceer of raking cornice to run up hips and valleys. The next one, I⁵ represents side bevel of hip and valley rafters, and the graduation I⁶ indicates side bevels of jack rafters. The scale F serves to determine the length of common rafters, while the scale F' serves to determine the length of hip and valley rafters.

The device is used as follows: If the operator desires to fit a molding or base around a post having nine corners (a nonagon) he moves the arm H to the figure 9 in the graduation I' and then fastens the said arm H in place by tightening the nut on the pivot bolt G. The angle between the arm H and the base B gives the angle for the nonagon. In a like manner if it is desired to find the angle of an undecagon, then the operator moves the arm H to the figure 11 in the graduation I' and thus obtains the desired angle. The rafter cuts are arranged conveniently so that the operator, by shifting the arm, can readily obtain the desired angle for whatever kind of rafter the graduation indicates.

It is understood that in cutting valley, jack and hip rafters, two bevels must be found before the cut can be made, the two bevels being the down bevel or plumb cut, and the other the side bevel. Now, the two bevels cannot readily be taken on the ordinary tools, but with my device I can readily set the two arms H and H' to obtain the two desired bevels. Suppose the operator desires to cut the hip and valley rafters for a roof, that is one-third pitch; that is, the rafter has eight inches of rise to one foot of run. Now, for the down bevel or plumb cut, the operator moves the arm H to the numeral 8 in the graduation I³, and then moves the arm H' to the mark 8 in the graduation I⁶, after which both arms H and H' are fastened in place by the pivot bolt G. The two desired angles are thus obtained, and the operator has no trouble to make the desired cuts.

The cuttings of jack rafters both down and side bevels, are taken in precisely the same manner as those of the hip and valley rafters as above described.

It will be readily understood that by being enabled to take both bevels with the one instrument, the operator saves considerable time and is not liable to make mistakes, as the graduations indicate the desired angles. As the length of a rafter is simply the hypotenuse of its rise and run; for example, say the roof is half pitch and the rafter stands at any angle of forty-five degrees, then the run and rise are equal or to each foot of run there would be one foot of rise. Now, the hypotenuse of twelve by twelve is 16.968; say seventeen inches in framing. Now, this hypotenuse is given in the scale F and consequently much figuring is saved, as the operator only multiplies seventeen as many times as there are feet in the run, thus obtaining the length of the rafter correctly. Now, if the rise of a common rafter for instance is twelve inches to one foot of run, the hip and valley rafters will have twelve inches rise to seventeen inches of run, so that the hypotenuse of twelve by seventeen, which is 20.8 and this taken as many times as there are feet of run to the common rafter will give the length of the hip or valley rafters, as desired.

Having thus fully described my invention, I claim as new and desire to secure by Letters Patent—

1. A measuring instrument comprising a right angle triangle, two arms pivoted on the said triangle, and a graduated segment forming an integral part of the triangle, and on which indicate the said arms at opposite sides, substantially as shown and described.

2. A measuring instrument comprising a right angle triangle formed on its base with a graduated extension, a pivot held in one side of the said triangle, two arms hung on the said pivot and adapted to fold in a recess in the right angle side, and a segment forming an integral part of the triangle and on which indicate the said arms on graduations formed on both sides of the said segment, substantially as shown and described.

LEONARD M. HODGE.

Witnesses:
JOSEPH W. HODGE,
JOHN F. DOWLE.